US011808964B1

(12) United States Patent
Shen et al.

(10) Patent No.: US 11,808,964 B1
(45) Date of Patent: Nov. 7, 2023

(54) FRONT LIGHT MODULE AND MULTI-LAYER STRUCTURE APPLIED TO FULL LAMINATION

(71) Applicant: Darwin Precisions Corporation, Hsinchu County (TW)

(72) Inventors: Yu-Shan Shen, Hsinchu County (TW); Yu-Hsiang Hsieh, Hsinchu County (TW); Chien-Ming Chu, Hsinchu County (TW); Hui-Ying Chiang, Hsinchu County (TW)

(73) Assignee: DARWIN PRECISIONS CORPORATION, Hsinchu County (TW)

( * ) Notice: Subject to any disclaimer, the term of this patent is extended or adjusted under 35 U.S.C. 154(b) by 0 days.

(21) Appl. No.: 17/950,516

(22) Filed: Sep. 22, 2022

(30) Foreign Application Priority Data

Aug. 11, 2022 (TW) .................................. 111130265

(51) Int. Cl.
*F21V 8/00* (2006.01)
(52) U.S. Cl.
CPC .................................. *G02B 6/0038* (2013.01)
(58) Field of Classification Search
CPC ... G02B 6/0038; G02B 6/0016; G02B 6/0018
See application file for complete search history.

(56) References Cited

U.S. PATENT DOCUMENTS

| 7,697,088 | B2 * | 4/2010 | Ohta | G02F 1/133602 |
| | | | | 349/114 |
| 2008/0062500 | A1 * | 3/2008 | Hagood | G02B 26/02 |
| | | | | 359/230 |
| 2012/0281430 | A1 * | 11/2012 | Huang | G02B 6/0061 |
| | | | | 362/603 |
| 2018/0088270 | A1 * | 3/2018 | Tuohioja | G02B 26/005 |
| 2019/0211168 | A1 * | 7/2019 | Thompson | C08J 7/043 |
| 2020/0016868 | A1 * | 1/2020 | Woody, V | B32B 7/02 |
| 2021/0249476 | A1 * | 8/2021 | Lin | H10K 59/121 |

FOREIGN PATENT DOCUMENTS

| CN | 1248330 A | * 3/2000 | .......... G02B 6/0048 |
| CN | 100492163 C | * 5/2009 | ............ G03B 21/56 |
| CN | 101493200 A | 7/2009 | |
| CN | 204807728 U | 11/2015 | |
| JP | 2012128191 A | * 7/2012 | |
| KR | 20090078763 A | * 1/2009 | |
| TW | M441846 U | 11/2012 | |
| TW | M499574 U | 4/2015 | |
| TW | I533040 B | 5/2016 | |

* cited by examiner

*Primary Examiner* — Fatima N Farokhrooz
(74) *Attorney, Agent, or Firm* — WPAT, P.C (57) ABSTRACT

A front light module applied to full lamination includes a display, a front light guide plate, a light-emitting unit, a transparent medium, and a cover layer. The front light guide plate is located over the display and includes a micro-structure. The micro-structure is recessed from an upper surface of the front light guide plate. The light-emitting unit is adjacent to the front light guide plate. The transparent medium is located over the front light guide plate. A space is located between the front light guide plate and the transparent medium. The cover layer is located over the transparent medium.

15 Claims, 5 Drawing Sheets

FRONT LIGHT MODULE AND MULTI-LAYER STRUCTURE APPLIED TO FULL LAMINATION

CROSS-REFERENCE TO RELATED APPLICATION

This application claims priority to Taiwan Application Serial Number 111130265, filed Aug. 11, 2022, which is herein incorporated by reference in its entirety.

BACKGROUND

Field of Invention

The present disclosure relates to a front light module and a multi-layer structure applied to full lamination.

Description of Related Art

The technology of full lamination is used in reflective display screen products such as tablet computers or e-books. How to propose a multi-layer structure applied to full lamination that can improve contrast and brightness of the image is one of the problems that the industry is eager to solve by investing research and development resources.

SUMMARY

In view of this, one purpose of present disclosure is to provide a front light module and a multi-layer structure applied to full lamination that can solve the aforementioned problems.

In order to achieve the above object, according to an embodiment of the present disclosure, a front light module applied to full lamination includes a reflective display device, a front light guide plate, a light-emitting unit, a transparent medium, and a cover layer. The front light guide plate is located over the reflective display device and includes a micro-structure. The micro-structure is recessed from an upper surface of the front light guide plate. The light-emitting unit is adjacent to the front light guide plate. The transparent medium is located over the front light guide plate. A space is located between the front light guide plate and the transparent medium. A refractive index of the transparent medium is in a range between 1.1 and 1.9. The cover layer is located over the transparent medium.

In one or more embodiments of the present disclosure, the front light module applied to full lamination further includes a first adhesive layer between the front light guide plate and the reflective display device.

In one or more embodiments of the present disclosure, the cover layer and the reflective display device are disposed on opposite sides of the front light module.

In one or more embodiments of the present disclosure, the front light module further includes a second adhesive layer between the front light guide plate and the transparent medium.

In one or more embodiments of the present disclosure, the second adhesive layer is adhered between the front light guide plate and the transparent medium by edge lamination.

In one or more embodiments of the present disclosure, the second adhesive layer is adhered between the front light guide plate and the transparent medium by full lamination.

In one or more embodiments of the present disclosure, the transparent medium has a convex structure on the lower surface of the transparent medium.

In one or more embodiments of the present disclosure, the second adhesive layer covers the lower surface of the transparent medium and the convex structures.

In one or more embodiments of the present disclosure, a portion of the second adhesive layer covering the convex structure abuts against the upper surface of the front light guide plate.

In one or more embodiments of the present disclosure, the front light module further includes a plurality of beads in the second adhesive layer. The beads are different in sizes such that a lower surface of the second adhesive layer is rough.

In one or more embodiments of the present disclosure, a portion of the lower surface of the second adhesive layer abuts against the upper surface of the front light guide plate.

In one or more embodiments of the present disclosure, the front light module further includes a spacer layer between the front light guide plate and the second adhesive layer, and the spacer layer separates the front light guide plate and the second adhesive layer.

In one or more embodiments of the present disclosure, the spacer layer is in a grid shape in a top view.

In one or more embodiments of the present disclosure, the front light module further includes a third adhesive layer between the transparent medium and the cover layer.

In one or more embodiments of the present disclosure, the micro-structure is located on a side of the front light guide plate away from the reflective display device.

In order to achieve the above object, according to an embodiment of the present disclosure, a multi-layer structure applied to full lamination includes a front light guide plate, a transparent medium, and a cover layer. The front light guide plate is located over a reflective display device and includes a micro-structure. The micro-structure is recessed from an upper surface of the front light guide plate. The transparent medium is located over the front light guide plate. A space is located between the front light guide plate and the transparent medium. A refractive index of the transparent medium is in a range between 1.1 and 1.9. The cover layer is located over the transparent medium.

In summary, in the front light module applied to full lamination of the present disclosure, since the upper surface of the front light guide plate is provided with the micro-structure, the light emitted by the light-emitting unit can be refracted and reflective through the micro-structure in the front light guide plate, so that a ratio of the light entering the reflective display device increases, thereby improving the contrast of the image. In the front light module and the multi-layer structure applied to full lamination of the present disclosure, since there is a space between the front light guide plate and the transparent medium, the probability of the light emitted by the light-emitting unit being totally reflected in the front light module increases, so that the light extraction efficiency can be improved by reflection on reflective display device, thereby enhancing the brightness of the image.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

In the drawings, the thickness of layers, films, panels, regions, etc., are exaggerated for clarity. Throughout the specification, the same reference numerals refer to the same elements. It will be understood that when an element such as a layer, film, region or substrate is referred to as being "on" or "connected to" another element, it can be directly on or connected to the other element, or Intermediate elements may also be present. In contrast, when an element is referred to as being "directly on" or "directly connected to" another element, there are no intervening elements present. As used herein, "connected" may refer to a physical and/or electrical connection. Furthermore, "electrically connected" or "coupled" may refer to the existence of other elements between the two elements.

It will be understood that, although the terms "first", "second", "third", etc. may be used herein to describe various elements, components, regions, layers, and/or parts. These elements, components, regions, and/or parts shall not be limited by these terms. These terms are only used to distinguish one element, component, region, layer, or part from another element, component, region, layer or part. Thus, "a first element", "component", "region", "layer", or "section" discussed below could be termed a second element, component, region, layer, or part without departing from the teachings herein.

The terminology used herein is for the purpose of describing particular embodiments only and is not limiting. As used herein, the singular forms "a," "an," and "the" are intended to include the plural forms including "at least one" unless the content clearly dictates otherwise. "Or" means "and/or". As used herein, the term "and/or" includes any and all combinations of one or more of the associated listed items. It will also be understood that, when used in this specification, the terms "comprising" and/or "including" designate the stated feature, region, integer, step, operation, presence of an element and/or part, but do not exclude the presence or addition of one or more other features, entireties of regions, steps, operations, elements, components, and/or combinations thereof.

Furthermore, relative terms such as "lower" or "bottom" and "upper" or "top" may be used herein to describe one element's relationship to another element, as shown in the figures. It should be understood that relative terms are intended to encompass different orientations of the device in addition to the orientation shown in the figures. For example, if the device in one of the figures is turned over, elements described as being on the "lower" side of other elements would then be oriented on "upper" sides of the other elements. Thus, the exemplary term "lower" may include an orientation of "lower" and "upper", depending on the particular orientation of the drawings. Similarly, if the device in one of the figures is turned over, elements described as "below" or "beneath" other elements would then be oriented "above" the other elements. Thus, the exemplary terms "below" or "under" can include an orientation of above and below.

As used herein, "about", "approximately", or "substantially" includes the stated value and the average value within an acceptable deviation of the particular value as determined by one of ordinary skill in the art, considering the discussed specific amount of measurement and measurement-related error (i.e., the limitations of the measurement system). For example, "about" can mean within one or more standard deviations of the stated value, or within ±30%, ±20%, ±10%, ±5%. Furthermore, as used herein, "about", "approximately" or "substantially" may be used to select a more acceptable range of deviation or standard deviation depending on optical properties, etching properties or other properties, and not one standard deviation may apply to all properties.

Unless otherwise defined, all terms (including technical and scientific terms) used herein have the same meaning as commonly understood by one of ordinary skill in the art to which this disclosure belongs. It will be further understood that terms such as those defined in commonly used dictionaries should be construed as having meanings consistent with their meanings in the context of the related art and the present disclosure, and are not to be construed as idealized or excessively formal meaning, unless expressly defined as such herein.

Exemplary embodiments are described herein with reference to cross-sectional views that are schematic views of idealized embodiments. Thus, variations in the shapes of the figures as a result of, for example, manufacturing techniques and/or tolerances, are to be expected. Accordingly, the embodiments described herein should not be construed as limited to the particular shapes of regions as shown herein, but rather include deviations in shapes resulting from, for example, manufacturing. For example, regions illustrated or described as flat may typically have rough and/or non-linear features. Additionally, the acute angles shown may be rounded. Thus, the regions illustrated in the figures are schematic in nature and their shapes are not intended to illustrate the precise shape of a region and are not intended to limit the scope of the claims.

The structure and function of each element included in a front light module 100 of this embodiment and the connection relationship between the elements will be described in detail below.

Figure 1:
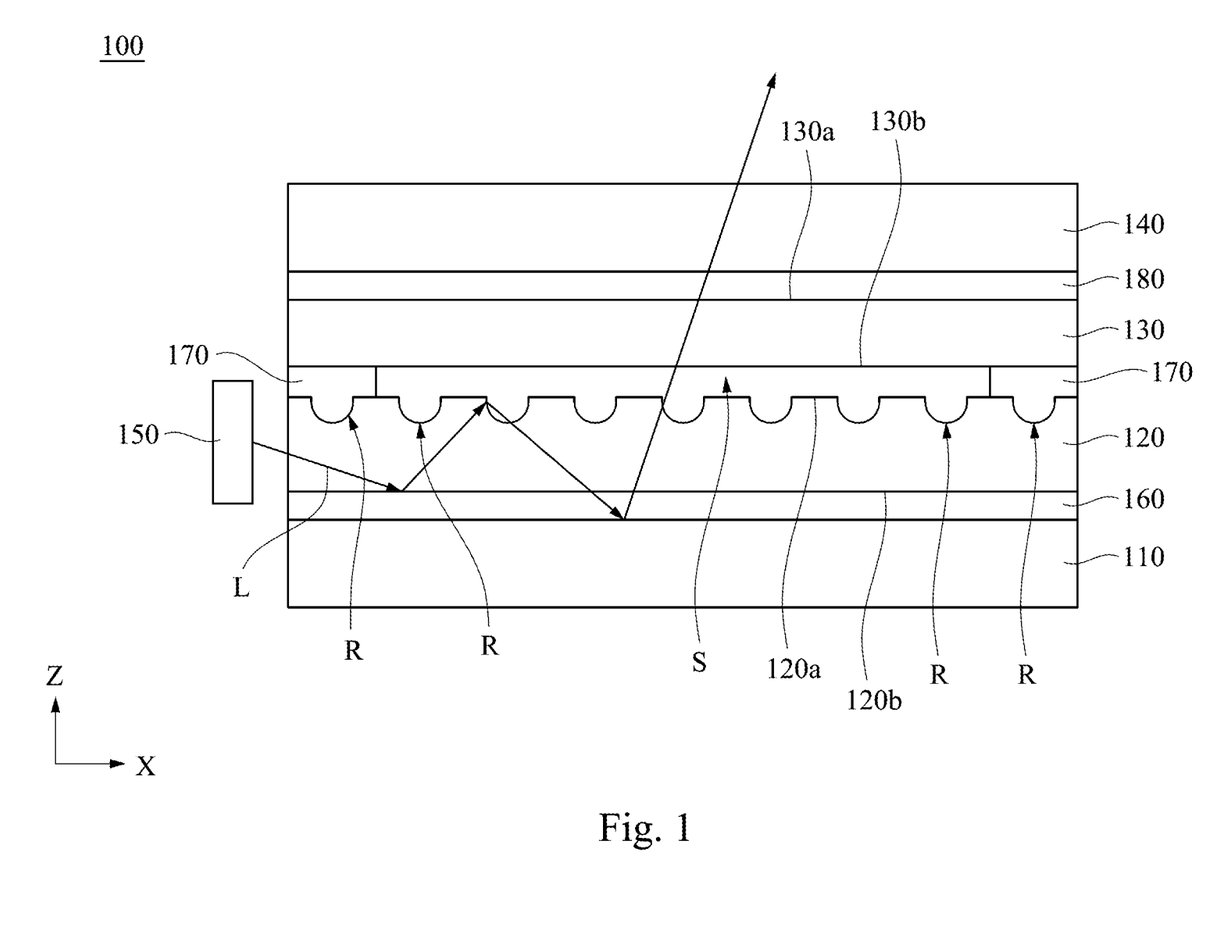
FIG. 1 is a schematic view of a multi-layer structure applied to full lamination in accordance with an embodiment of present disclosure.

Reference is made to FIG. 1. FIG. 1 is a schematic view of a front light module 100 according to an embodiment of the present disclosure. In this embodiment, the front light module 100 includes a reflective display device 110, a front light guide plate 120, a transparent medium 130, a cover layer 140, and a light-emitting unit 150. The front light guide plate 120 is located over the reflective display device 110. The front light guide plate 120 has an upper surface 120a and a lower surface 120b. The front light guide plate 120 includes a plurality of micro-structures R. As shown in FIG. 1, the micro-structures R are disposed on a side of the front light guide plate 120 away from the reflective display device 110. In some embodiments, the quantity of micro-structures R may be plural. In this embodiment, the micro-structures R are extended from the front light guide plate 120. The transparent medium 130 is located over the front light guide plate 120. The transparent medium 130 has an upper surface 130a and a lower surface 130b. As shown in FIG. 1, a space S is formed between the upper surface 120a of the front light guide plate 120 and recessed inner surfaces of the micro-structures R and the transparent medium 130. In some embodiments, the space S is an air layer filled with air. In this embodiment, the cover layer 140 is located over the transparent medium 130. As shown in FIG. 1, the cover layer 140 and the reflective display device 110 are disposed on opposite sides of the front light module 100. As shown in FIG. 1, the light-emitting unit 150 is adjacent to the front light guide plate 120 and is configured to emit light L.

Reference is made again to FIG. 1. In this embodiment, the front light module 100 further includes a first adhesive layer 160, a second adhesive layer 170, and a third adhesive layer 180. The first adhesive layer 160 is disposed between the reflective display device 110 and the front light guide plate 120 and configured to adhere to the reflective display device 110 and the front light guide plate 120. The second adhesive layer 170 is disposed between the front light guide plate 120 and the transparent medium 130 and configured to adhere to the front light guide plate 120 and the transparent medium 130. The third adhesive layer 180 is disposed between the transparent medium 130 and the cover layer 140 and configured to adhere to the transparent medium 130 and the cover layer 140. As shown in FIG. 1, after entering the front light guide plate 120, the light L emitted by the light-emitting unit 150 may exit the front light module 100 by reflection on the first adhesive layer 160, refraction or reflection by the micro-structures R, and reflection by the reflective display device 110. The more detailed structure of the front light module 100 will be described below.

In some embodiments, the first adhesive layer 160 is adhered between the reflective display device 110 and the front light guide plate 120 by means of a whole-surface lamination (i.e., full lamination). In some embodiments, the second adhesive layer 170 is rectangular and hollow. In some embodiments, the second adhesive layer 170 is adhered between the front light guide plate 120 and the transparent medium 130 by means of a frame sticking (i.e., edge lamination). In some embodiments in which the second adhesive layer 170 is rectangular and hollow, a hollowed portion of the second adhesive layer 170, the upper surface 120a of the front light guide plate 120, and the lower surface 130b of the transparent medium 130 define the space S. In some embodiments, the third adhesive layer 180 is adhered between the transparent medium 130 and the cover layer 140 by means of a whole-surface lamination (i.e., full lamination).

In some embodiments, the transparent medium 130, the third adhesive layer 180, and the cover layer 140 have similar refractive indices. In some embodiments, the refractive index of the transparent medium 130 is in a range between 1.1 and 1.9. In some embodiments, the refractive index of the transparent medium 130 is preferably in a range between 1.33 and 1.57. In some embodiments, the refractive index of the transparent medium 130 is 1.4. In some embodiments, the refractive index of the third adhesive layer 180 is 1.47. In some embodiments, the refractive index of the cover layer 140 is 1.5. Since the refractive indices of adjacent elements are similar, the effects of reducing the reflectivity of the light L and increasing the light extraction efficiency can be achieved.

With the aforementioned structural configuration, after the light L emitted by the light-emitting unit 150 enters the front light guide plate 120, the light L is refracted or reflected at least by through the micro-structures R and travels toward the reflective display device 110, and the light L passes through the front light guide plate 120, the space S, the transparent medium 130, the third adhesive layer 180, and the cover layer 140 by the reflection on the reflective display device 110, and then exits the front light module 100. Since the light L is refracted by passing through the micro-structures R, the proportion of the light L reaching the reflective display device 110 is increased, after light L extracts after the reflection by the reflective display device 110, the light L would at least pass through the hollowed portion of the second adhesive layer 170, the transparent medium 130, the third adhesive layer 180, and the cover layer 140. Therefore, the reflective display device 110 can control the light extraction efficiency of the front light module 100 when switching between the bright state and the dark state, thereby achieving the effect of improving the image contrast. For example, the structural configuration of the front light module 100 can increase the image contrast ratio (CR) to 7.

In some embodiments, the reflective display device 110 may be a reflective display. For example, the reflective display device 110 may be a reflective liquid crystal display (RLCD) or other similar reflective displays. In some embodiments, the front light guide plate 120 may be a light guide plate or other similar light-transmitting material. In some embodiments, the front light guide plate 120 may include PMMA resin (polymethyl methacrylate), PC resin (polycarbonate resin), or other suitable materials. In some embodiments, the transparent medium 130 may include PC resin (polycarbonate resin) or other suitable transparent materials. In some embodiments, the cover layer 140 may be a glass substrate. In some embodiments, the cover layer 140 may include glass or other suitable transparent material. In some embodiments, the light-emitting unit 150 may be an LED light source or other possible light sources. In some embodiments, the first adhesive layer 160, the second adhesive layer 170, and the third adhesive layer 180 may be optical clear adhesive (OCA) or other adhesive. In some embodiments, the micro-structures R are formed by a hot pressing process, an injection process, or an ultraviolet (UV) Imprinting process.

Next, a front light module 100A in an embodiment of the present disclosure will be described.

Figure 2:
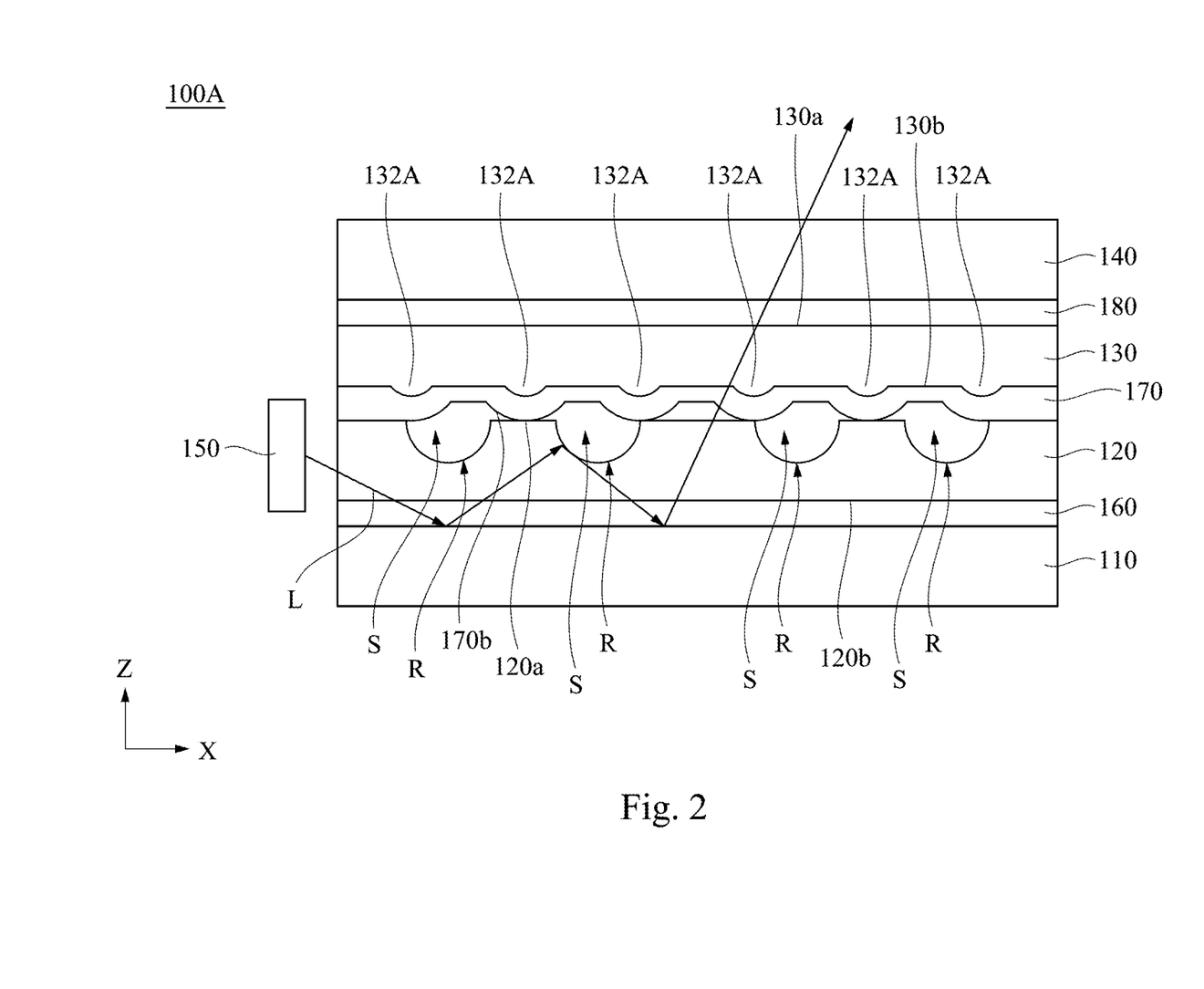
FIG. 2 is a schematic view of a multi-layer structure applied to full lamination in accordance with an embodiment of present disclosure.

Reference is made to FIG. 2. FIG. 2 is a cross-sectional view of a front light module 100A according to an embodiment of the present disclosure. As shown in FIG. 2, the structural configuration in the front light module 100A is substantially similar to that of the front light module 100. The difference between the front light module 100A and the front light module 100 is that the transparent medium 130 of the front light module 100A has convex structures 132A, and the convex structures 132A are located on the lower surface 130b of the transparent medium 130. In some embodiments, the quantity of the convex structures 132A may be plural. The second adhesive layer 170 of the front light module 100A covers the lower surface 130b of the transparent medium 130 and the convex structures 132A. As shown in FIG. 2, a space S is formed between the upper surface 120a of the front light guide plate 120 and the recessed inner surfaces of the micro-structures R and the transparent medium 130.

Reference is made again to FIG. 2. In some embodiments, the second adhesive layer 170 is adhered between the front light guide plate 120 and the transparent medium 130 by means of a whole-surface lamination (i.e., full lamination). In some embodiments, a space S is formed between the upper surface 120a of the front light guide plate 120 including recessed inner surfaces of the micro-structures R and the lower surface 170b of the second adhesive layer 170. In some embodiments, as shown in FIG. 2, the convex structures 132A protrude from the lower surface 130b of the transparent medium 130 toward a direction to the reflective display device 110. In some embodiments, the second adhesive layer 170 covers and is coated on the lower surface 130b of the transparent medium 130 and the convex structures 132A, such that a portion of the second adhesive layer 170 covering the convex structures 132A abuts against the upper surface 120a of the front light guide plate 120. In some embodiments, the lower surface 170b of the second adhesive layer 170 contacts the upper surface 120a of the front light guide plate 120 to form the space S.

With the aforementioned structural configuration, the reflective display device 110 can control the light extraction efficiency of the front light module 100A when switching the bright state and the dark state, thereby achieving the effect of improving image contrast. For example, the structural configuration of the front light module 100A can increase the image contrast ratio (CR) to 7.

In some embodiments, the convex structures 132A extend from the lower surface 130b of the transparent medium 130. In some embodiments, the material of the convex structure 132A is the same as the material of the transparent medium 130. In some embodiments, the convex structures 132A may comprise PC resin (polycarbonate resin) or other suitable transparent materials.

Next, a front light module 100B in an embodiment of the present disclosure will be described.

Figure 3:
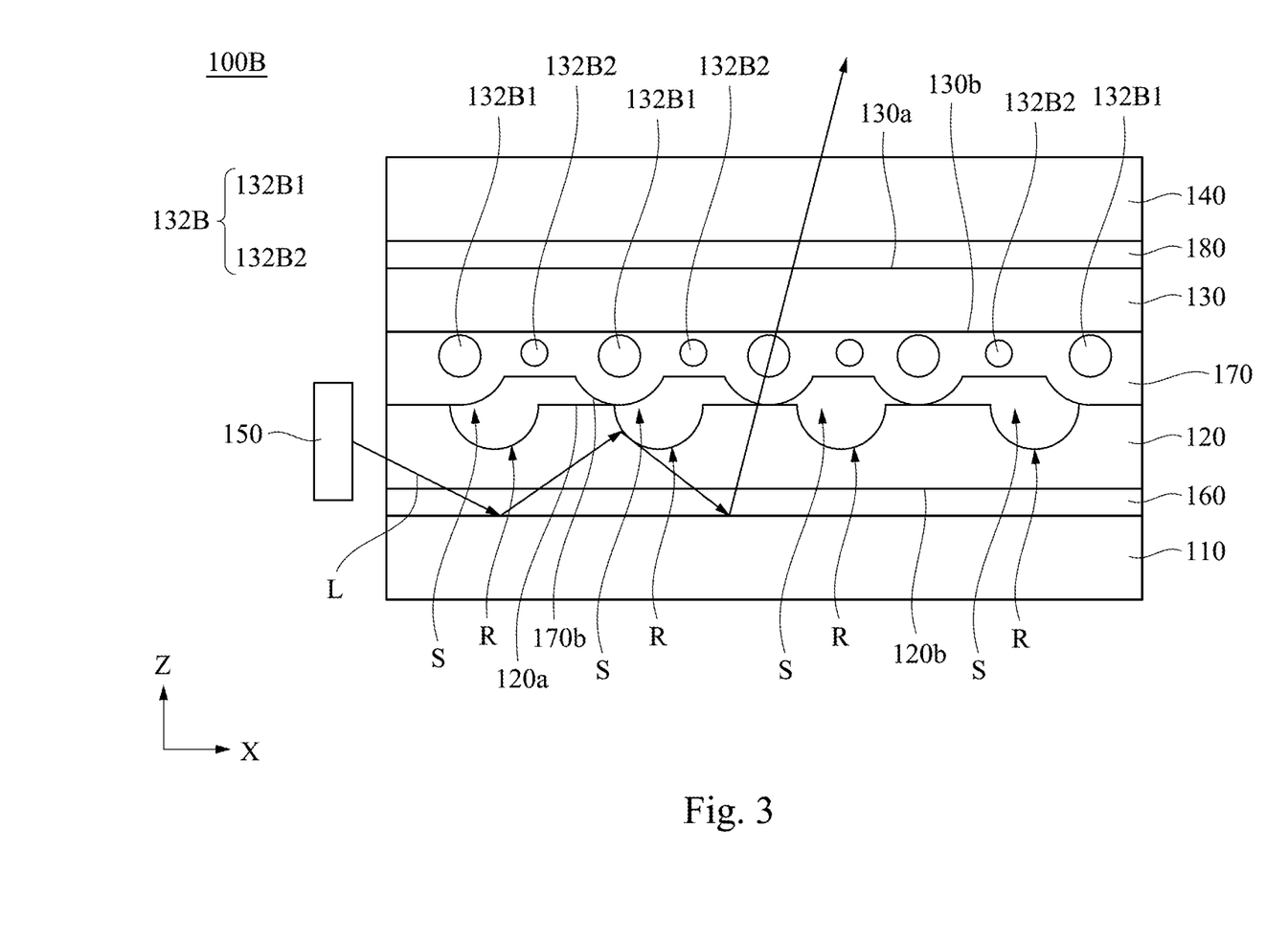
FIG. 3 is a schematic view of a multi-layer structure applied to full lamination in accordance with an embodiment of present disclosure.

Reference is made to FIG. 3. FIG. 3 is a cross-sectional view of a front light module 100B according to an embodiment of the present disclosure. As shown in FIG. 3, the structural configuration of the front light module 100B is substantially similar to that of the front light module 100. The difference between the front light module 100B and the front light module 100 is that the second adhesive layer 170 of the front light module 100B has beads 132B therein. As shown in FIG. 3, the beads 132B further include first beads 132B1 and second beads 132B2. As shown in FIG. 3, the sizes of the first beads 132B1 and the second beads 132B2 are different from each other. In some embodiments, the size of the first beads 132B1 is larger than the size of the second beads 132B2. The second adhesive layer 170 of the front light module 100B covers the lower surface 130b of the transparent medium 130 and wraps the first beads 132B1 and the second beads 132B2. In some embodiments, the first beads 132B1 and the second beads 132B2 are arranged alternatively. As shown in FIG. 3, a space S is formed between the upper surface 120a of the front light guide plate 120 including recessed inner surfaces of the micro-structures R and the second adhesive layer 170.

Reference is made again to FIG. 3. In some embodiments, the second adhesive layer 170 is adhered between the front light guide plate 120 and the transparent medium 130 by means of a whole-surface lamination (i.e., full lamination). In some embodiments, the second adhesive layer 170 covers and is coated on the lower surface 130b of the transparent medium 130, the first beads 132B1, and the second beads 132B2, such that a portion of the second adhesive layer 170 covering the first beads 132B1 is more protruding than a portion of the second adhesive layer 170 covering the second beads 132B2. In some embodiments, as shown in FIG. 3, the portion of the second adhesive layer 170 covering the first beads 132B1 abuts against the upper surface 120a of the front light guide plate 120. In some embodiments, the lower surface 170b of the second adhesive layer 170 corresponding to the first beads 132B1 contacts the upper surface 120a of the front light guide plate 120 to form the space S.

With the aforementioned structural configuration, the reflective display device 110 can control the light extraction efficiency of the front light module 100B when switching between the bright state and the dark state, thereby achieving the effect of improving image contrast. For example, the structural configuration of the front light module 100B can increase the image contrast ratio (CR) to 7.

In some embodiments, a material of the beads 132B is the same as a material of the transparent medium 130. In some embodiments, the beads 132B may include PC resin (polycarbonate resin) or other suitable transparent material. In some embodiments, the beads 132B are substantially spherical, but the present disclosure is not limited thereto.

Next, a front light module 100C in an embodiment of the present disclosure will be described.

Figure 4:
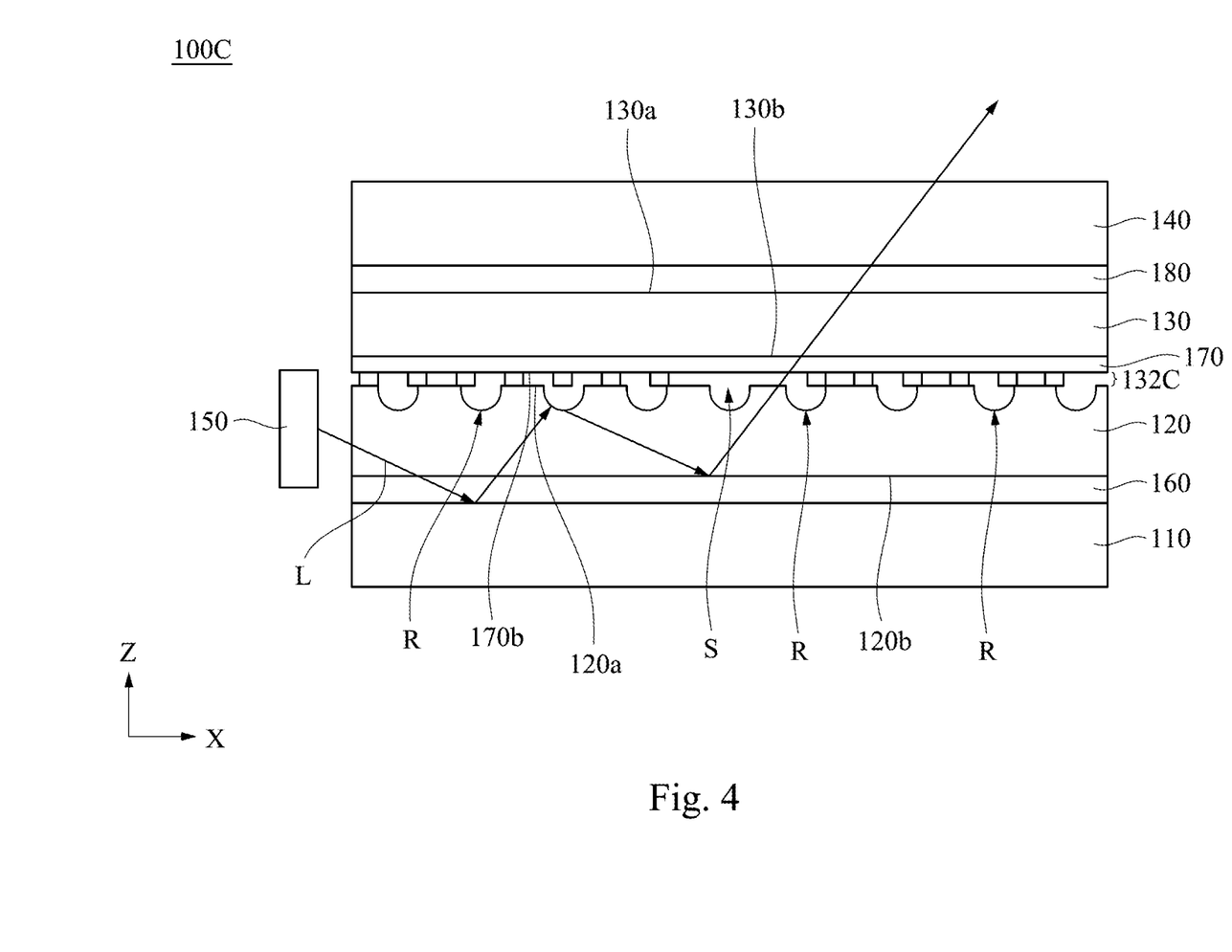
FIG. 4 is a schematic view of a multi-layer structure applied to full lamination in accordance with an embodiment of present disclosure.

Reference is made to FIG. 4. FIG. 4 is a cross-sectional view of a front light module 100C according to an embodiment of the present disclosure. As shown in FIG. 4, the structural configuration of the front light module 100C is substantially similar to that of the front light module 100. The difference between the front light module 100C and the front light module 100 is that the front light module 100C further includes a spacer layer 132C. The spacer layer 132C is located between the front light guide plate 120 and the second adhesive layer 170. In some embodiments, the spacer layer 132C is generally mesh-shaped. The second adhesive layer 170 of the front light module 100C covers the lower surface 130b of the transparent medium 130. As shown in FIG. 4, a space S is formed between the upper surface 120a of the front light guide plate 120 including recessed inner surfaces of the micro-structures R and the second adhesive layer 170, and hollowed portions of the spacer layer 132C and the lower surface 170b of the second adhesive layer 170, the upper surface 120a of the front light guide plate 120, and the recessed inner surfaces of the micro-structures R form a space S.

Reference is made again to FIG. 4. In some embodiments, the second adhesive layer 170 is adhered between the front light guide plate 120 and the transparent medium 130 by means of a whole-surface lamination (i.e., full lamination). In some embodiments, the second adhesive layer 170 covers and coated on the lower surface 130b of the transparent medium 130 by a coating method. In some embodiments, as shown in FIG. 4, the spacer layer 132C separates the front light guide plate 120 from the second adhesive layer 170 by a distance.

Figure 5:
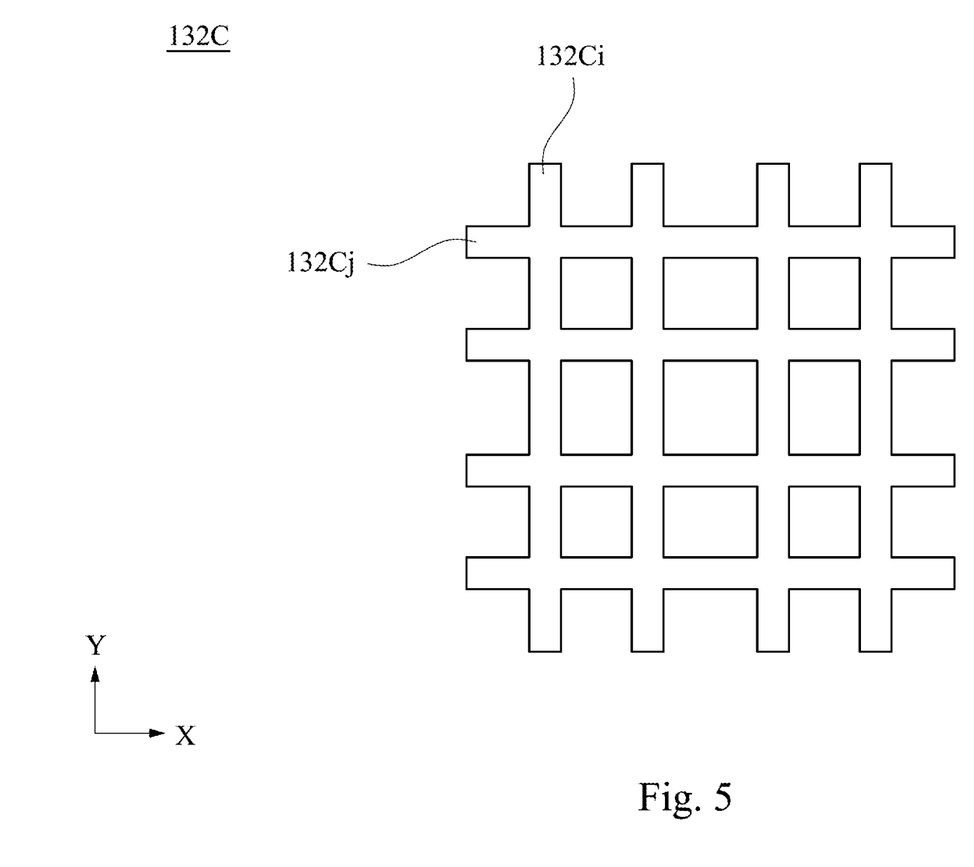
FIG. 5 is a top view of a spacer layer in accordance with an embodiment of present disclosure.

Reference is made to FIG. 5. FIG. 5 is a top view of the spacer layer 132C according to an embodiment of the present disclosure. In this embodiment, as shown in FIG. 5, the spacer layer 132C is grid-shaped in a top view. The spacer layer 132C includes a plurality of longitudinal portions 132Ci and a plurality of latitudinal portions 132Cj. As shown in FIG. 5, a plurality of hollowed portions are formed between the longitudinal portions 132Ci and the latitudinal portions 132Cj.

With the aforementioned structural configuration, the reflective display device 110 can control the light extraction efficiency of the front light module 100C when switching the bright state and the dark state, thereby achieving the effect of improving image contrast. For example, the structural configuration of the front light module 100C can increase the image contrast ratio (CR) to 7.

In some embodiments, as shown in FIG. 5, the longitudinal portions 132Ci are elongated in a first direction (e.g., y-direction) and arranged parallel to a second direction (e.g., x-direction), and the latitudinal portions 132Cj are elongated in the second direction (e.g., x-direction) and arranged parallel to the first direction (e.g., y-direction). In some embodiments, the longitudinal portions 132Ci and the latitudinal portions 132Cj are substantially perpendicular to each other. In some embodiments, a material of the spacer layer 132C is the same as a material of the transparent medium 130. In some embodiments, the spacer layer 132C may include PC resin (polycarbonate resin) or other suitable transparent material.

From the above detailed description of the specific embodiments of the present disclosure, it can be clearly seen that in the front light module applied to full lamination of the present disclosure, since the upper surface of the front light guide plate is provided with micro-structures, the light emitted by the light-emitting unit can be refracted and reflected through the micro-structures in the front light guide plate, so that the ratio of the light entering the reflective display device is increased, thereby improving the contrast of the image. In the front light module and the multi-layer structure applied to full lamination of the present disclosure, since there is a space between the front light guide plate and the cover layer, and since the multi-layer structure is formed by laminating different materials with similar refractive indices, so that the reflectivity can be reduced and the light extraction efficiency can be improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A front light module applied to full lamination, comprising:
    a reflective display device;
    a front light guide plate located over the reflective display device and comprising a micro-structure, wherein the micro-structure is recessed from an upper surface of the front light guide plate;
    a light-emitting unit adjacent to the front light guide plate;
    a transparent medium located over the front light guide plate, and a space is located between the front light guide plate and the transparent medium, wherein a refractive index of the transparent medium is in a range between 1.1 and 1.9, wherein the transparent medium further has a convex structure below the transparent medium, the convex structure is offset-aligned with the micro-structure, and both the convex structure and the micro-structure are curve and
    a cover layer located over the transparent medium.

2. The front light module of claim 1, further comprising a first adhesive layer between the front light guide plate and the reflective display device.

3. The front light module of claim 1, wherein the cover layer and the reflective display device are disposed on opposite sides of the front light module.

4. The front light module of claim 1, further comprising a second adhesive layer between the front light guide plate and the transparent medium.

5. The front light module of claim 1, further comprising a third adhesive layer between the transparent medium and the cover layer.

6. The front light module of claim 1, wherein the micro-structure is located on a side of the front light guide plate away from the reflective display device.

7. The front light module of claim 4, wherein the second adhesive layer is adhered between the front light guide plate and the transparent medium by edge lamination.

8. The front light module of claim 4, wherein the second adhesive layer is adhered between the front light guide plate and the transparent medium by full lamination.

9. The front light module of claim 4, wherein the convex structure is located on a lower surface of the transparent medium.

10. The front light module of claim 4, further comprising a plurality of beads in the second adhesive layer, the beads are different in size such that a lower surface of the second adhesive layer is rough.

11. The front light module of claim 9, wherein the second adhesive layer covers the lower surface of the transparent medium and the convex structure.

12. The front light module of claim 9, wherein a portion of the second adhesive layer covering the convex structure abuts against the upper surface of the front light guide plate.

13. The front light module of claim 10, wherein a portion of the lower surface of the second adhesive layer abuts against the upper surface of the front light guide plate.

14. A multi-layer structure applied to full lamination, comprising:
    a front light guide plate located over a reflective display device and comprising a micro-structure, wherein the micro-structure is recessed from an upper surface of the front light guide plate;
    a transparent medium located over the front light guide plate, and a space is located between the front light guide plate and the transparent medium, wherein a refractive index of the transparent medium is in a range between 1.1 and 1.9, wherein the transparent medium further has a convex structure below the transparent medium, the convex structure is offset-aligned with the micro-structure, and both the convex structure and the micro-structure are curve and
    a cover layer located over the transparent medium.

15. The multi-layer structure of claim 14, wherein the transparent medium includes polycarbonate resin.

* * * * *